United States Patent
Lind et al.

(10) Patent No.: US 9,341,164 B2
(45) Date of Patent: May 17, 2016

(54) FIXATION OF A HEATING MAT TO A BLADE OF A WIND TURBINE

(75) Inventors: Soeren Oemann Lind, Næstved (DK); Finn Daugaard Madsen, Billund (DK); Karsten Schibsbye, Boulder, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 853 days.

(21) Appl. No.: 13/638,632

(22) PCT Filed: Sep. 16, 2010

(86) PCT No.: PCT/EP2010/063590
§ 371 (c)(1),
(2), (4) Date: Dec. 12, 2012

(87) PCT Pub. No.: WO2011/127995
PCT Pub. Date: Oct. 20, 2011

(65) Prior Publication Data
US 2013/0195661 A1 Aug. 1, 2013

(30) Foreign Application Priority Data
Apr. 12, 2010 (EP) ..................................... 10159631

(51) Int. Cl.
*F03D 11/00* (2006.01)

(52) U.S. Cl.
CPC ........... *F03D 11/0025* (2013.01); *Y02E 10/722* (2013.01)

(58) Field of Classification Search
CPC .............................. F03D 11/0025; B64D 15/12
See application file for complete search history.

(56) References Cited

U.S. PATENT DOCUMENTS

| | | | |
|---|---|---|---|
| 5,825,608 A | 10/1998 | Azodi-Kazerooni | |
| 6,002,081 A * | 12/1999 | Sakuragi | ................. H01L 35/32 136/203 |
| 7,078,658 B2 * | 7/2006 | Brunner | ................. B64D 15/12 219/201 |

FOREIGN PATENT DOCUMENTS

| | | | | |
|---|---|---|---|---|
| CN | 201363233 Y | 12/2009 | | |
| CN | 201367977 Y | 12/2009 | | |
| DE | 102004042423 A1 * | 3/2006 | | ............. B29C 70/30 |
| EP | 0680878 A1 | 11/1995 | | |
| EP | 1715160 A1 | 10/2006 | | |
| EP | 1935784 A2 | 6/2008 | | |
| GB | 666609 A * | 2/1952 | | ............. B64D 15/12 |
| GB | 2319942 A | 6/1998 | | |

OTHER PUBLICATIONS

Franken, Machine Translation of DE 102004042423, pp. 1-10.*

* cited by examiner

*Primary Examiner* — Nathaniel Wiehe
*Assistant Examiner* — Cameron Corday

(57) ABSTRACT

A blade for a wind turbine includes at least one heating mat for generating heat, wherein the heating mat is mounted at an outer surface of the blade. The blade further includes at least one through-hole running from an inner space of the blade to the outer surface of the blade. The blade further has at least one conductive element, wherein the conductive element is electrically coupled to the heating mat. The conductive element is inserted in the through-hole for generating an electric connection between the inner space and the outer surface.

12 Claims, 2 Drawing Sheets

FIXATION OF A HEATING MAT TO A BLADE OF A WIND TURBINE

CROSS REFERENCE TO RELATED APPLICATIONS

This application is the U.S. National Stage of International Application No. PCT/EP2010/063590 filed Sep. 16, 2010, and claims the benefit thereof. The International Application claims the benefits of European Patent Application No. 10159631.0 EP filed Apr. 12, 2010. All of the applications are incorporated by reference herein in their entirety.

FIELD OF INVENTION

The present invention relates to a blade for a wind turbine and to a method of manufacturing a blade with a heating system for a wind turbine.

ART BACKGROUND

Icing on any exposed part of a wind turbine can occur and cause decreased performance of the wind turbine. Furthermore e.g. when ice is accumulated on one or more of the rotor blades of a wind turbine, excess vibration problems from uneven blade icing may occur. This in turn may generate excessive mechanical loads on the wind turbine components leading eventually to wind turbine shut-down or to wind turbine faults.

Hence, it is necessary to avoid ice or to remove ice located on wind turbine blades by a deicing system or by a heating system. In particular, it is known to use an electrical heating that is attached to an outer surfaces of the blade.

The heating is connected by electrical wiring to a power supply and to a control unit. The wiring can be damaged by lightning strikes, because the conductors run along the outer surface of the blade to the location of the heating. In particular, there is a need to heat the tip ends of the blades, so that in conventional heating systems a conductor has to run from the tip end to the root end of the blade. In particular, in the region of the tip end of the blade, the risk is severe that the conductor running to the heating being hit by a lightning strike.

SUMMARY OF THE INVENTION

The object of the present invention is to provide a heating for a blade of a wind turbine with a robust heating system and a proper electrical connection.

This object is solved by a blade for a wind turbine and by a method for manufacturing a blade with a heating system for a wind turbine according to the independent claims.

According to a first aspect of the invention, a blade for a wind turbine is presented. The blade comprises at least one heating mat for generating heat, wherein the heating mat is mounted to the blade, e.g. to an outer surface of the blade inside a laminate of the blade or to an inner space of the blade. Moreover, the blade comprises at least one through-hole running from an inner space of the blade to the outer surface of the blade. Moreover, the blade comprises at least one conductive element wherein the conductive element is electrically coupled to the heating mat. The conductive element is inserted in the through-hole for generating an electrical connection between the inner space and the outer surface of the blade.

According to a further aspect of the invention, a method of manufacturing a blade with a heating system for a wind turbine is presented. At an outer surface of the blade at least one heating mat for generating heat is mounted. At least one through-hole is formed into the blade, wherein the through-hole runs from an inner space of the blade to the outer surface of the blade. At least one conductive element is inserted in the through-hole for generating an electrical convection between the inner space and the outer surface. The conductive element is electrically coupled to the heating mat.

The conductive element which is inserted in a through-hole of the blade may comprise a bushing, a cable, a bolt or other conductive elements that connects the inner space of the blade to the outer surface of the blade.

The heating mat is generally formed as a flat stripe-shaped mat extending in a longitudinal direction. The longitudinal direction defines the direction between two end points of the heating mat (in particular the direction or distance between two end points parallel to a plane that is parallel to the blade surface) between which the length of the heating mat is defined. The height extends vertically (in particular parallel to a normal of the (plane of the) outer blade surface) form the outer surface of the heating mat, and the width of the heating mat is the distance from side to side, measuring across the heating mat at right angles to the length. The width is shorter than the length of the heating mat. The width may be approximately 25 cm (centimeter) to 1.50 m (meter), preferably approximately 55 cm. The length of the heating mat may be generally twice as much as the length of the blade. The heating mat may comprise a length of approximately 60 m to 200 m (meter), preferably 90 m. Accordingly, the blade may have a length of approximately 30 m to 100 m (meter). The height of the heating mat may be approximately 0.5 mm (Millimeter) cm to 1 cm (centimeter). Preferably, the heating mat comprises an area density of the fibers of approximately 400 $g/m^2$ to 800 $g/m^2$, in particular approximately 600 $g/m^2$ (grams per square meter). On opposed ends along the longitudinal (extending) direction, the first end section and the second end section are formed. To the first end section and the second end section a power input and/or a power output connection may be attached.

By the power terminals, a voltage of 100 V AC to 1000 V (Volt) AC is applicable. In a static condition of the blades or the wind turbine, a voltage of 400 V AC the heating mat may generate a temperature of approximately 10° C. (Celsius) and a voltage of 650 V AC to 750 V AC may generate a temperature of approximately 20° C. to 30° C. This may though vary in dependency of the chosen heating mat area density and heating mat area. In a working condition of the blades, it is desired to apply a voltage for generating a heat by the heating mat along the surface of the blade of approximately a temperature of 2° C. to 4° C. in order to have a proper de-icing effect.

By the present invention, the power supply for the heating mat is directed by the conductive element in the through-hole from the inside of the blade to the outside of the blade. Thus, long power connecting wires along the surface of the blade may be obsolete. The through-hole may be formed in the blade at a region, where the heating mat is located on the outer surface, so that the conductive element runs from the heating mat directly through the through-hole to an inner region of the blade without running along the outer surface of the blade.

This has the technical effect, that the risk of damages in the power supply may be reduced. In particular lightning strikes at the blade may cause damage to conductors running along the outer surface of the blade. By the present invention, the through-hole is formed inside the blade, so that the run of a connector along the outer surface of the blade is reduced and thus the risk that the conductor along the outer surface is getting hit by a lightning strike is reduced as well.

In order to provide the electrical coupling of the heating mat to a power supply, a plurality of through-holes with inserted conductive elements may be formed into the blade. Thus, a plurality of electrical connections to the heating mat is generated. For example, in each through-hole separate power in and power out connections to the conducting elements or power cables are coupleable. Furthermore it is outlined, that as well more than on heating mats that are electrically coupled to a respective coupling element in a through-hole are mountable to the blade in an exemplary embodiment.

According to a further exemplary embodiment, the heating mat comprises (electrical conducting) carbon fibres for generating heat. Carbon fibres are very robust, so that the risk of damage due to a lightning strike may be reduced. Moreover, the carbon fibres of the heating mat may be flexibly woven and thus adapted to the requirements of the blade to be heated. For instance, it may be beneficial to provide a higher density of the woven carbon fibres along the leading edge of the blade, so that more heat is produced in this leading edge area. Alternatively or additionally, the heating mat may also be made of other conductive materials, such as metal, e.g. copper fibres, or conductive synthetic material.

According to a further exemplary embodiment, the blade further comprises a root end section with a fixing element for fixing the blade to a hub of the wind turbine. The through-hole is formed in the root end section.

The fixing elements in the root end section are for instance fixing bolts for fixing a blade to a holder (hub) of the blades of the wind turbine. The root end section is located on the opposite side of the tip end of the blade with respect to a longitudinal direction of the blade. In particular, the root end section may describe the first half of the blade starting from the root end running along the longitudinal direction of the blade. In particular, the root end section may define one third, one fourth, one fifth of the blade section starting from the root end of the blade in longitudinal direction to the tip end. In particular, the root end section may define the section on the blade that extends from the root end approximately 1 m, 2 m, 5 m, 10 m or 20 m in the longitudinal direction to the tip end of the blade for instance.

According to a further exemplary embodiment, the conductive element comprises an outer section which protrude from the outer surface and an inner section which extends into the inner space. A conductor is fixable to the inner section for supplying power from a power supply unit to the conductive element, and wherein the heating mat is electrically connected to the outer section.

The conductor element is for instance a cable or a strip conductor attached to an inner surface of the blade. The conductor elements may be connected to a power supply that is attached within the blade or within the housing of the wind turbine. Thus, by using for example a slip ring connection between the conductor element and the power supply a power connection between the rotating blade and the housing element may be achieved.

By the present exemplary embodiment, the conductor runs inside an inner space of the blade to the through-hole and to the conductive element inserted in the through-hole, respectively. Thus, the conductor for supplying power is located inside the blade, so that it is not necessary to provide a long run of a conductor at the outer surface of the blade. Thus, the risk of being hit by a lightning strike is reduced.

According to a further exemplary embodiment, the conductive element comprises a conductive bolt. The conductive bolt is fixed to the through-hole in such a way that between a bolt head of the conductive bolt and the outer surface the heating mat is clamped for generating an electrically conductive clamping connection.

The bolts may comprise a screw with a clamping nut. Moreover, the bolt may comprise an integrally formed bolt head or a washer for increasing the clamping area between e.g. the washer and the heating mat.

Thus, by generating an electrically conductive clamping connection between the conductive element and the heating mat, it is not necessary to provide e.g. connection holes within the heating mat. By the clamping connection, an easy connection between the heating mat and the power supply is achieved.

According to a further exemplary embodiment, the blade comprises a conductive sheet. The conductive sheet is mounted to the outer surface by the conductive bolt and is electrically coupled to the heating mat. The conductive sheet may increase the contact area and the clamping area between the bolt and the heating mat. Thus, a proper electrical and mechanical connection is achieved.

According to a further exemplary embodiment, the blade further comprises a conductive bushing fixed inside the through-hole. The conductive bolt is fixed in the conductive bushing. Thus, a proper electrical connection with an improved efficiency is achieved.

According to a further exemplary embodiment, the blade further comprises a conductive mesh that is interposed between the conductive element and the heating mat. By using the conductive mesh, e.g. a metal mesh, a larger contact area between the heating mat and the conductive element is generated. By using the conductive mesh, the contact area is increased, without causing a high weight. In particular, the conductive mesh may be wrapped around an end section of the heating mat and partially enveloping the heating mat. Thus, in particular when connecting the heating mat by a clamping connection, an improved electrical and mechanical connection is achievable.

The conductive mesh may comprise steel, aluminum, copper or carbon material.

According to a further exemplary embodiment, the blade further comprises an adhesive layer for generating a laminate out of the conductive element and the heating mat. Thus, by using e.g. resin as adhesive for forming the adhesive layer, a rigid and robust connection between the conductive element and the heating mat is achievable without negatively effecting the electrical connection between the conductive element and the heating mat.

According to a further exemplary embodiment, the blade further comprises a cover layer, wherein the cover layer covers the heating mat, the conductive element and the outer surface such that a homogeneous outer layer of the blade is formed.

The cover layer leads to a homogeneous and smooth profile of the blade, so that the aerodynamic characteristics are not affected due to a fixation of the heating mat to the outer surface of the blade. Moreover, the cover layer may comprise protection characteristics, so that a robust blade is achievable. The cover layer may comprise for instance glass fibre material.

According to a further exemplary embodiment, the heating mat comprises a first end section and a second end section. The second end section defines an opposite end section of the heating mat in a longitudinal direction of the heating mat with respect to the first end section. The blade further comprises a power transmitting section located on the outer surface. The power transmitting section comprises the through-hole and the conductive element for supplying power to the heating mat. The first end section and the second end section are located inside the power transmitting section and are electrically connected to the conductive element. The heating mat comprises a first section running from the first end section to a region outside of the power transmitting section. The heating mat comprises a second section running from the region outside of the power transmitting section to the second end section inside the power transmitting section.

According to a further exemplary embodiment, the heating mat is mounted at an outer surface of the blade. The heating mat comprises a first section with a first end section and a second section with a second end section. The first end section and the second end section are electrically connectable (e.g. by a cable) to a respective power terminal for supplying power to the heating mat. The second end section defines an opposite end section of the heating mat in the longitudinal direction of the heating mat with respect to a first end section. The first section and the second section run along the surface of the blade in one or more loops from the first end section to the second end section.

Moreover, the heating mat may comprise a transition section that connects the first section and the second section outside of the power transmitting section.

The heating mat comprises a run parallel to the plane of the blade surface with e.g. a half-loop shape within a plane that is in general parallel to the plane of the blade surface. The heating mat runs from one through-hole which provides a connection to a power terminal to the outside of the power transmitting section and after a half loop (e.g. a curve with approximately 180 degrees) the heating mat runs back from outside of the power transmitting section inside to the power transmitting section, where the second end section of the heating mat is finally connected to the conductive element in a further through-hole for providing a connection to a further power terminal. The section of the heating mat that connects the first section and the second section outside of the power transmitting section is the transition section.

By the exemplary embodiment, a blade is presented that comprises the heating mat that forms a half loop and/or a plurality of loops, wherein in one common power transmitting section the first end section and the second end section are connected to a power supply via the power terminals. Thus, the electrical connection and thus the sole necessary electrical wiring have to be applied at the power transmitting section and not in another section of the blade, such as the tip end section.

This has the technical effect, that no electrical connections, such as electrical wires, are needed to be mounted and connected along the blade surface except in the power transmitting section, in which the through-holes and the end sections of the heating mat are located. Thus, less risk of damages to the heating mat due to lightning strikes or other physical impacts are reduced.

According to a further exemplary embodiment of the method, the mounting comprises an adding of an adhesive to the heating mat and the outer surface for forming a laminate and a curing of the adhesive.

Thus, in the production and manufacturing process of the blade, the heating mat and the electrical connection are manufactured simultaneously. In particular, the heating mat may be attached to the outer surface of the blade and by a vacuum resin moulding or resin transfer moulding method, for example, the blade including the heating mats is easy to manufacture.

Summarizing, by the present invention the power is supplied from the inner space of the blade through the through-hole to the outer surface of the blade, where the heating mat is attacked. In particular, by the above-described invention, a good electrical connection of the (carbon fibre) heating mat as well as the supplying of an electrical connection through the through-hole of the blade is achieved.

According to the present invention one (or a plurality of) heating mats that comprises electrical connections e.g. at the root end section of the blade is e.g. mechanically connected to a conductive element in a through-hole or is attached to the conductive element by a vacuum pressed resin moulding method, for example.

By an exemplary embodiment of the present invention, for instance conductive meshes for increasing the clamping area between the conductive element and the heating mat are applicable, so that a proper electrical connection with a low resistance is achieved. In this way, electrical power is saved during deicing of the blade, so that the heating is more efficient.

In particular, by locating the through-holes for providing the electrical connections in the root end part of the blade, the risk of damage of the electrical connection due to lightning strikes is reduced.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
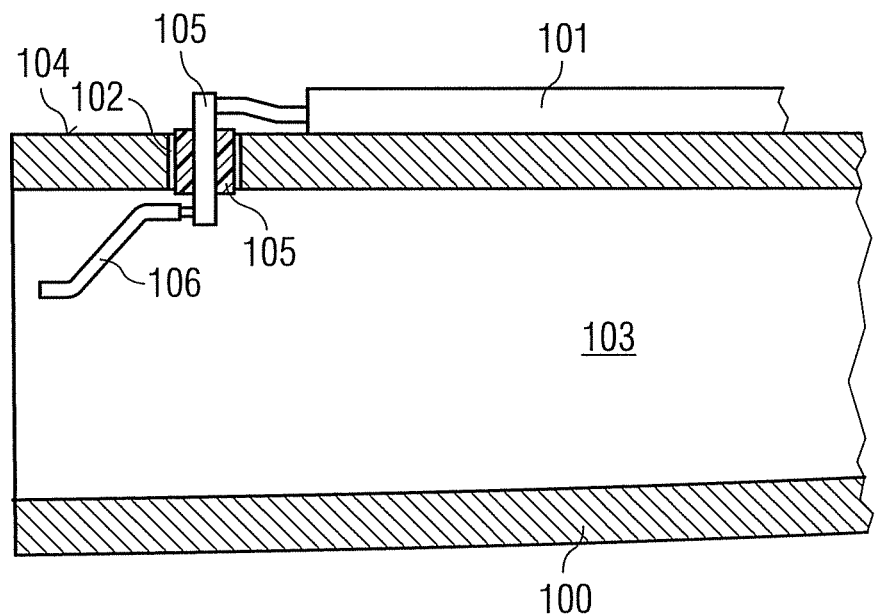
FIG. 1 shows a schematical view of an exemplary embodiment of the present invention.

The illustrations in the drawings are schematical. It is noted that in different figures, similar or identical elements are provided with the same reference signs.

FIG. 1 shows a blade 100 for a wind turbine. The blade 100 comprises a heating mat 101 for generating heat, wherein the heating mat 101 is mounted to an outer surface 104 of the blade 100. Moreover, a through-hole 102 is shown, wherein the through-hole 102 runs from an inner space 103 of the blade 100 to the outer surface 104 of the blade 100. Moreover, the blade 100 comprises a conductive element 105, wherein the conductive element 105 is electrically coupled to the heating mat 101. The conductive element 105 is inserted in the through-hole 100 for generating an electric connection between the inner space 103 and the outer surface 104.

As shown in FIG. 1, the conductive element 105 comprises a bushing and/or a bolt, wherein both, the bushing and/or the bolt are electrically conductive.

In the inner space 103 of the plate 100 a conductor 106, such as a conductor cable, may be guided inside of the blade 100 to a power supply. The power supply may be located in a hub or in a housing of the wind turbine, wherein by a slip ring connection a power connection between the conductor 106 and the power supply may be generated. On the outer surface 104 of the blade 103 the conductive element 105, such as the bolt, is connected to a power connection of the heating mat 101. The through-hole 102 is located close to the power connection of the heating mat 101, so that a conductor running along the outer surface 104 from the conductive element 105 to the heating mat 101 is obsolete or the lengths of the run of the conductor at the outer surface is very short.

Figure 2:
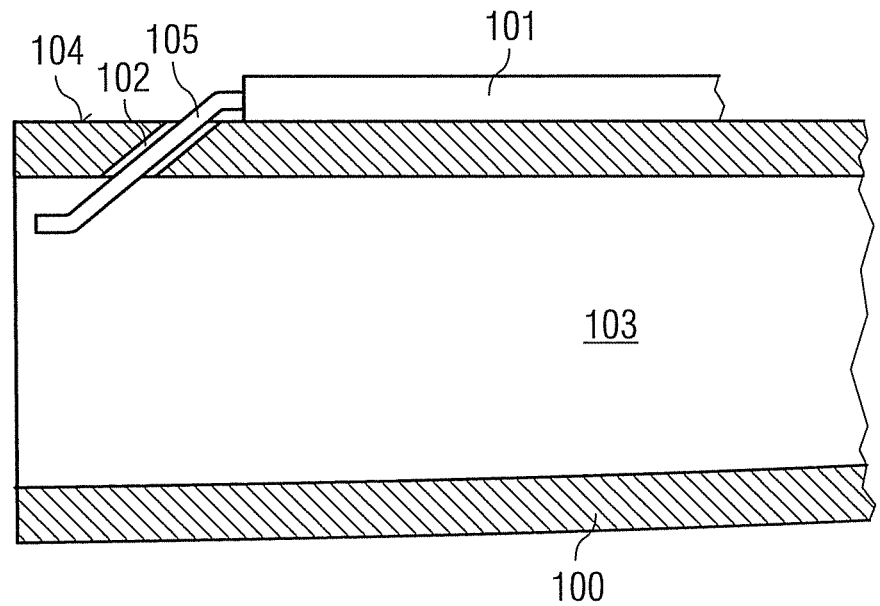
FIG. 2 shows schematically a conductor for the conductive element according to an exemplary embodiment of the present invention.

FIG. 2 illustrates schematically a further exemplary embodiment, wherein to the blade 103 a through-hole 102 connecting the inner space 103 and the outer surface 104 is drilled. A conductor 105, such as a cable, directly connects the heating mat 101 with a power supply.

The through-hole 102 may comprise a distance along the outer surface 104 to the heating mat 101 for example of approximately 10 cm, 50 cm, 1 m or 2 m (meter).

Figure 3:
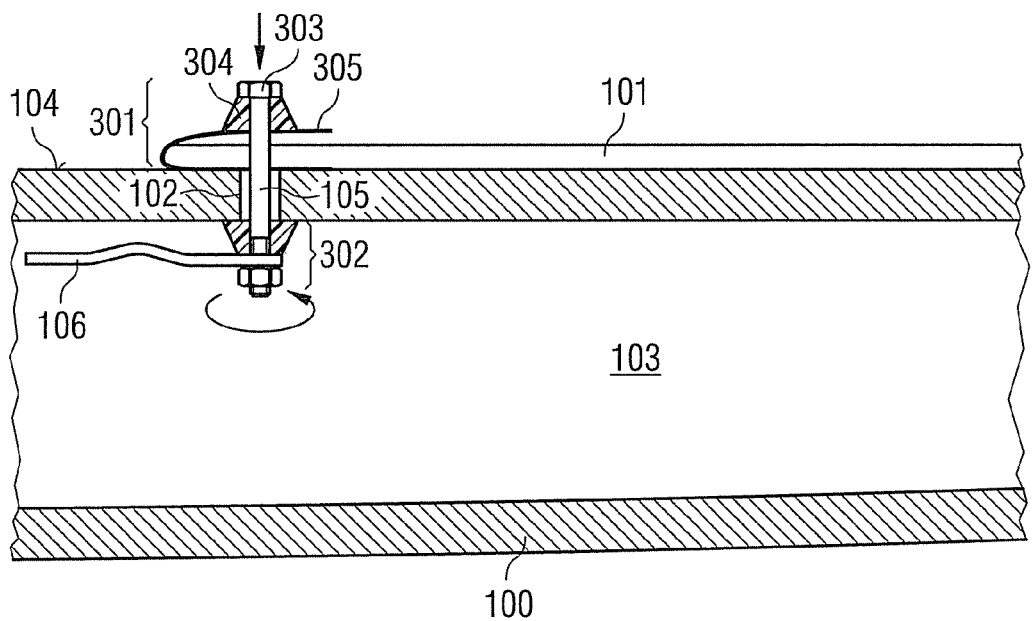
FIG. 3 shows schematically a clamping connection between the heating mat and the conductive element according to an exemplary embodiment of the present invention.

FIG. 3 shows the heating mat 101 that is clamped by a clamping connection to the conductive element 105. The conductive element 105 is for example a conductive bolt that comprises a bolt head 303. Between the bolt head 303 and the heating mat 101 an electrical conductive block of a material and/or a conductive sheet 304 may be interposed in order to improve the clamping connection by increasing the clamping area between the heating mat 101 and the conductive sheet 304. Additionally, by increasing the clamping area, the electrical conductivity between the conductive element 105 and the heating mat 101 is improved as well. From the outer surface 104 an outer section 301 of the conductive element 105 protrudes. At the outer section 301 of the conductive element 105 the clamping means, such as the conductive sheet 304 or the conductive mesh 305, are attached. The conductive element 105 protrudes also to the inner space 103, wherein the protruding section of the conductive element 105 forms an inner section 302. To the inner section 302 a washer or a further conductive sheet may be attached. A conductor 106 is clamped to the inner section 302 of the conductive element 105. The conductor 106 runs to a power supply.

By the exemplary embodiment of FIG. 3, an end section of the heating mat 101, that is located preferably in the root end section of the blade 100, is clamped together with a copper block (conductive sheet 304) and the copper grid or mesh 305 by one or more conductive elements 105, such as bolts. The conductive element 105 (e.g. the bolts) runs through the through-hole 102 of the blade 100 from the inner space 103 to the outer surface 104.

The heating mat 101 may be for example a carbon fibre heating mat. The heating mat 101 is for example pressed together with the conductive mesh 305 and the conductive element 105. A setting material or an adhesive, e.g. an epoxy or a polyester resin, is applied to the heating mat 101, the conductive mesh 305 and the conductive element 105 on the blade 101. Next, all components are pressed together. The setting material is removed by a vacuum. After curing, the heating mat and the other components are firmly attached to the blade 101. Thus, a laminate is produced.

Figure 4:
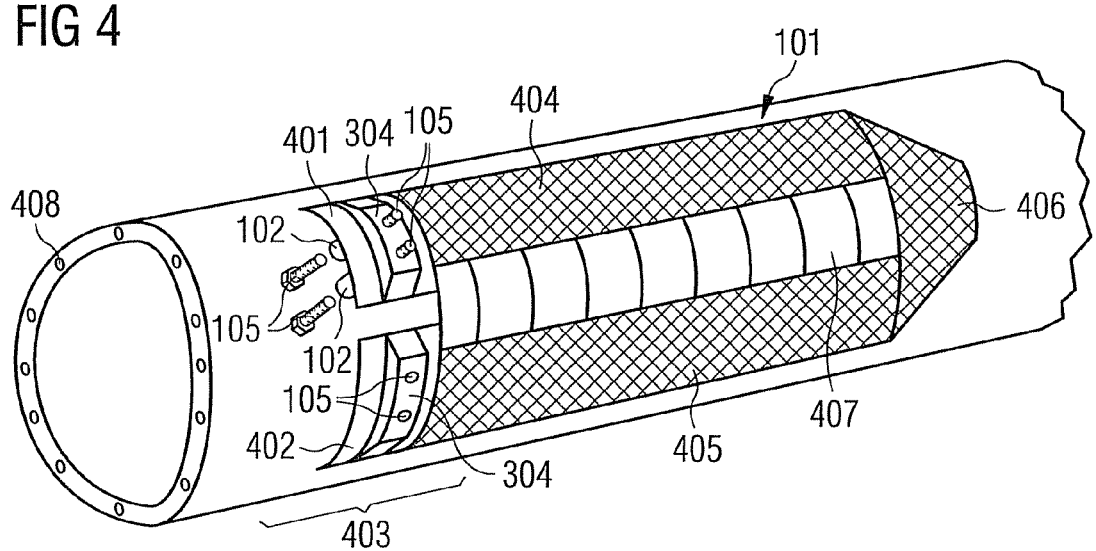
FIG. 4 illustrates a schematical view of a run of a heating mat in a half loop according to an exemplary embodiment of the present invention.

FIG. 4 shows a strip-like shaped heating mat 101 that runs with a half loop run. The heating mat 101 comprises a first end section 401 and a second end section 402.

The first end section 401 and the second end section 402 of the heating mat 101 are located inside a power transmitting section 403 that is formed close to the root end of the blade 101. In the root end fixing elements 408 for fixing the blade to a hub of a wind turbine are installed. In order to generate an electrical connection to the first end section 401 and the second end section 402 of the heating mat 101, the first end sections 401 is connected to the conductive element 105 and the second conductive element 402 is connected to a further conductive element 105. Each of the plurality of conductive elements 105 is installed in a respective one of the plurality of through-holes 102 in the power transmitting section 403 of the blade 101. The conductive elements 105 are for example screws that run through the through-holes 102 and further connect and fix the heating mat 101 to the blade 100. The screws are electrically conductive and generate an electrical connection to the heating mat 101. The screws may be screwed into the conductive sheet 304 in order to fix the heating mat 101 to the blade 100.

Between the first section 404 and the second section 405 of the heating mat 101 a distance 407 is kept, so that no short circuit is generated. A glass fibre material used as insulation material may be interposed within the distance 407.

In a transition section 406, the first section 404 crosses over into the second section 405. Therefore, the heating mat 101 may be folded in order to achieve a change in the run of the heating mat 101. In a further exemplary embodiment, the shape of the heating mat 101 is curved in order to achieve a change in the run of the heating mat 101.

The end sections 401, 402 are located in the power transmitting section 403, where the through-holes 102 for providing a power connection are located. Thus, there is no need for electrical wiring along the outer surface 104 of the blade 101. There is only a need to connect the end sections 401, 402 in the region of the root end. In this way, there is less risk of damages of the heating mats 101 due to lightning strikes on the blade.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 blade
101 heating mat
102 through-hole
103 inner space
104 outer surface
105 conductive element
106 conductor
301 outer section
302 inner section
303 bolt head
304 conductive sheet
305 conductive mesh
401 first end section
402 second end section
403 power transmitting section
404 first section 405 second section
406 transition section
407 distance between first and second section
408 fixing element

The invention claimed is:

1. Blade for a wind turbine, comprising:
at least one heating mat for generating heat, wherein the heating mat is mounted in contact with an outer surface of the blade,
at least one through-hole running from an inner space of the blade to an outer surface of the blade, and
at least one conductive element,
   wherein the conductive element is electrically coupled to the heating mat,
   wherein the conductive element is inserted in the through-hole for generating an electric connection between the inner space and the outer surface,
   wherein the conductive element comprises a conductive bolt,
   wherein the conductive bolt is fixed into the through-hole such that, between a bolt head of the conductive bolt and the outer surface, the heating mat is clamped for generating an electrically conductive clamping connection.

2. The blade according to claim 1, wherein the heating mat comprises carbon fibres.

3. The blade according to claim 1, further comprising:
a root end section with a fixing element for fixing the blade to a hub of the wind turbine, wherein the through-hole is formed in the root end section.

4. The blade according to claim 1, wherein the conductive element comprises an outer section, which protrudes from the outer surface, and an inner section, which extends into the inner space, wherein a conductor is fixable to the inner section for supplying power from a power supply unit to the conductive element, and wherein the heating mat is electrically connected to the outer section.

5. The blade according to claim 1, further comprising:
a conductive sheet,
   wherein the conductive sheet is mounted to the outer surface by the conductive bolt, and wherein the conductive sheet is electrically coupled to the heating mat.

6. The blade according to claim 1, further comprising:
a conductive bushing fixed inside the through-hole, wherein the conductive bolt is fixed in the conductive bushing.

7. The blade according to claim 1, further comprising:
a conductive mesh which is interposed between the conductive element and the heating mat.

8. The blade according to claim 1, further comprising:
an adhesive layer for generating a laminate out of the conductive element and the heating mat.

9. The blade according to claim 1,
wherein the heating mat comprises a first end section and a second end section,
wherein the second end section defines an opposite end section of the heating mat in a longitudinal direction of the heating mat with respect to the first end section,
wherein the blade further comprises a power transmitting section located on the outer surface,
wherein the power transmitting section comprises the through-hole and the conductive element for supplying power to the heating mat,
wherein the first end section and the second end section are located inside the power transmitting section and are electrically connected to the conductive element,
wherein the heating mat comprises a first section running from the first end section to a region outside of the power transmitting section, and
wherein the heating mat comprises a second section running from the region outside of the power transmitting section to the second end section inside the power transmitting section.

10. A method of manufacturing a blade with a heating system for a wind turbine, the method comprising:
mounting at least one heating mat for generating heat in contact with an outer surface of the blade,
forming at least one through-hole into the blade, wherein the through-hole runs from an inner space of the blade to the outer surface of the blade,
inserting at least one conductive element in the through-hole for an electric connection between the inner space and the outer surface, and
electrically coupling the conductive element to the heating mat,
   wherein the conductive element comprises a conductive bolt,
   wherein the conductive bolt is fixed into the through-hole such that, between a bolt head of the conductive bolt and the outer surface, the heating mat is clamped for generating an electrically conductive clamping connection.

11. The method according to claim 10, wherein the mounting comprises:
adding an adhesive to the heating mat and the outer surface for forming a laminate, and curing the adhesive.

12. The method according to claim 10, further comprising:
covering the heating mat, the conductive element and the outer surface with a cover layer such that a homogeneous outer layer of the blade is formed.

* * * * *